(12) United States Patent
Nakajima et al.

(10) Patent No.: US 9,737,945 B2
(45) Date of Patent: Aug. 22, 2017

(54) ELECTRICAL DISCHARGE MACHINING APPARATUS

(71) Applicant: Mitsubishi Electric Corporation, Tokyo (JP)

(72) Inventors: Yoji Nakajima, Tokyo (JP); Tatsuya Abe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/781,449

(22) PCT Filed: Mar. 27, 2014

(86) PCT No.: PCT/JP2014/058946
§ 371 (c)(1),
(2) Date: Sep. 30, 2015

(87) PCT Pub. No.: WO2015/145682
PCT Pub. Date: Oct. 1, 2015

(65) Prior Publication Data
US 2016/0039028 A1    Feb. 11, 2016

(51) Int. Cl.
*B23H 1/04*    (2006.01)
*B23H 1/10*    (2006.01)
(Continued)

(52) U.S. Cl.
CPC ............... *B23H 1/10* (2013.01); *B23H 1/04* (2013.01); *B23H 7/02* (2013.01); *B23H 7/36* (2013.01)

(58) Field of Classification Search
CPC .............. B23H 1/10; B23H 7/02; B23H 7/36
See application file for complete search history.

(56) References Cited

U.S. PATENT DOCUMENTS 1,413,579 A * 4/1922 Gill ..................... A47J 37/101
99/347
2,025,406 A * 12/1935 Whelan ................ B65D 23/06
215/41
(Continued)

FOREIGN PATENT DOCUMENTS

DE          3925009 A1    1/1991
JP         59-081019 A    5/1984
(Continued)

OTHER PUBLICATIONS

Communication dated Dec. 9, 2015 from the German Patent and Trademark Office in counterpart application No. 112014002087.7.
(Continued)

*Primary Examiner* — David Angwin
*Assistant Examiner* — John J Norton
(74) *Attorney, Agent, or Firm* — Sughrue Mion, PLLC; Richard C. Turner (57) ABSTRACT

An electrical discharge machining apparatus includes: a surface plate; a machining tank that surrounds the surface plate, retains a machining liquid, and has at least a part that serves as a substantially box-shaped vertically moveable ascent/descent machining tank, the ascent/descent machining tank having an outlet in an ascent/descent inner wall of the ascent/descent machining tank; an ascent/descent device that raises and lowers the ascent/descent machining tank; a sub-tank that receives the machining liquid that overflows from the machining tank; a slit that is provided in an end wall of the sub-tank for allowing a connection member to pass through, the connection member connecting the ascent/descent machining tank and the ascent/descent device; and a seal that is arranged in a gap between the ascent/descent machining tank and an inner wall of the sub-tank and
(Continued)

prevents the machining liquid in the machining tank from leaking out into the sub-tank.

2 Claims, 8 Drawing Sheets

(51) Int. Cl.
*B23H 7/02* (2006.01)
*B23H 7/36* (2006.01)

(56) References Cited

U.S. PATENT DOCUMENTS

| | | | | |
|---|---|---|---|---|
| 2,097,912 A * | 11/1937 | Burnham | ............ | B65D 1/08 |
| | | | | 215/329 |
| 2,318,611 A * | 5/1943 | Jackson | ............ | B65D 23/06 |
| | | | | 215/41 |
| 3,739,712 A * | 6/1973 | Duning | ............ | A47J 37/044 |
| | | | | 99/349 |
| 3,780,642 A * | 12/1973 | Bay | ............ | A47J 36/06 |
| | | | | 126/381.1 |
| 3,857,381 A * | 12/1974 | Kato | ............ | A47J 37/101 |
| | | | | 126/384.1 |
| 3,893,831 A * | 7/1975 | Doane | ............ | F24C 15/20 |
| | | | | 126/299 E |
| 4,158,343 A * | 6/1979 | Nord | ............ | B05B 13/0421 |
| | | | | 118/315 |
| 4,198,040 A * | 4/1980 | Colasent | ............ | A47J 36/06 |
| | | | | 220/254.4 |
| 4,262,585 A * | 4/1981 | Leuschner | ............ | A47J 31/545 |
| | | | | 392/471 |
| 4,862,795 A * | 9/1989 | Hawkins | ............ | F24C 15/18 |
| | | | | 126/1 R |
| 5,223,688 A * | 6/1993 | Hosoda | ............ | B23H 1/10 |
| | | | | 137/577 |
| 5,795,449 A * | 8/1998 | Sasaki | ............ | B23H 7/02 |
| | | | | 204/224 M |
| 5,941,028 A * | 8/1999 | Hicks | ............ | E04D 13/152 |
| | | | | 454/260 |
| 6,758,357 B2 * | 7/2004 | Grillo | ............ | B65D 23/06 |
| | | | | 215/392 |
| 6,831,245 B1 * | 12/2004 | Koba | ............ | B23H 7/02 |
| | | | | 219/69.12 |
| 6,914,186 B2 * | 7/2005 | Koba | ............ | B23H 1/00 |
| | | | | 174/17 CT |
| 8,975,553 B2 * | 3/2015 | Saigusa | ............ | B23H 11/003 |
| | | | | 219/69.11 |
| 2001/0025831 A1 * | 10/2001 | Kobayashi | ............ | B23H 7/02 |
| | | | | 219/69.12 |
| 2013/0327744 A1 | 12/2013 | Matsumoto et al. | | |
| 2015/0231720 A1 * | 8/2015 | Hamada | ............ | B23H 11/00 |
| | | | | 219/69.19 |

FOREIGN PATENT DOCUMENTS

| | | |
|---|---|---|
| JP | 59-173522 U | 11/1984 |
| JP | 04-2526 U | 1/1992 |
| JP | 07-266136 A | 10/1995 |
| JP | 09-011046 A | 1/1997 |
| JP | 10-296543 A | 11/1998 |
| JP | 11-77436 A | 3/1999 |
| JP | 2010105074 A * | 5/2010 |
| JP | 4850319 B1 | 1/2012 |
| JP | 5173737 B2 | 4/2013 |
| JP | 5264293 B2 | 8/2013 |
| JP | 5264410 B2 | 8/2013 |

OTHER PUBLICATIONS

Written Opinion of the International Searching Authority of PCT/JP2014/058946 dated Jul. 1, 2014.

International Search Report of PCT/JP2014/058946 dated Jul. 1, 2014.

* cited by examiner

ELECTRICAL DISCHARGE MACHINING APPARATUS

CROSS REFERENCE TO RELATED APPLICATIONS

This is a National Stage of International Application No. PCT/JP2014/058946 filed Mar. 27, 2014, the contents of which are incorporated herein by reference in its entirety.

FIELD

The present invention relates to an electrical discharge machining apparatus that machines a workpiece immersed in a machining liquid, such as a wire electrical discharge machining apparatus and a die sinking electrical discharge machining apparatus.

BACKGROUND

Conventional electrical discharge machining apparatuses have been disclosed that create an electrical discharge in a small gap between a workpiece and an electrode to machine the workpiece, which is immersed in a machining liquid retained in a machining tank. Such conventional electrical discharge machining apparatuses include a surface plate on which the workpiece is placed, the machining tank that surrounds the surface plate, retains the machining liquid, and has at least a part that serves as a vertically moveable ascent/descent machining tank, the ascent/descent machining tank having an outlet in its ascent/descent inner wall, the outlet allowing the machining liquid to overflow to the ascent/descent machining tank, an ascent/descent device that raises and lowers the ascent/descent machining tank, a sub-tank that receives the machining liquid that leaks out from the machining tank, and a seal arranged in a gap between the ascent/descent machining tank and the inner wall of the sub-tank to prevent the machining liquid in the machining tank from leaking out into the sub-tank (for example, see Patent Literatures 1 and 2).

CITATION LIST

Patent Literature

Patent Literature 1: Japanese Patent 5173737
Patent Literature 2: Japanese Patent 5264293

SUMMARY

Technical Problem

The seal of the conventional electrical discharge machining apparatuses disclosed in Patent Literatures 1 and 2 may wear out due to operation over a long period and cause the machining liquid to leak through the gap between the ascent/descent inner wall and the inner wall of the sub-tank. The sub-tank has a slit for allowing a connection member to pass through. The connection member connects the ascent/descent machining tank and the ascent/descent device, which is placed outside the sub-tank. This poses a problem that the machining liquid that has leaked out through the seal flows on a bottom face of the ascent/descent machining tank to approach the slit and splashes through the slit and onto the floor surface outside the sub-tank where the electrical discharge machining apparatus is installed to stain the floor surface.

The present invention has been achieved in view of the above, and an object of the present invention is to provide an electrical discharge machining apparatus that prevents a machining liquid that has leaked through a seal from splashing through a slit in a sub-tank and onto a floor surface outside the sub-tank where the electrical discharge machining apparatus is installed.

Solution to Problem

To solve the above described problem and achieve the object an electrical discharge machining apparatus according to the present invention includes: a surface plate that a workpiece is placed on; a machining tank that surrounds the surface plate, retains a machining liquid, and has at least a part that serves as a box-shaped vertically moveable ascent/descent machining tank, the ascent/descent machining tank having an outlet in an ascent/descent inner wall of the ascent/descent machining tank, the outlet allowing the machining liquid to overflow; an ascent/descent device that raises and lowers the ascent/descent machining tank; a sub-tank that receives the machining liquid that overflows from the machining tank; a slit that is provided in an end wall of the sub-tank for allowing a connection member to pass through, the connection member connecting the ascent/descent machining tank and the ascent/descent device; and a seal that is arranged in a gap between the ascent/descent machining tank and an inner wall of the sub-tank and prevents the machining liquid in the machining tank from leaking out into the sub-tank. The electrical discharge machining apparatus creating an electrical discharge in a small gap between the workpiece and an electrode to machine the workpiece, the workpiece being immersed in the machining liquid retained in the machining tank. A slit-like receiving opening is provided at a bottom of the ascent/descent machining tank on the ascent/descent inner wall side, the slit-like receiving opening receiving the machining liquid that leaks through the seal and drips along the ascent/descent inner wall and recovering the machining liquid in the ascent/descent machining tank.

Advantageous Effects of Invention

An electrical discharge machining apparatus according to the present invention produces an effect of preventing a machining liquid that has leaked through a seal from splashing through a slit in a sub-tank and onto the floor surface outside the sub-tank where the electrical discharge machining apparatus is installed.

DESCRIPTION OF EMBODIMENTS

Exemplary embodiments of a wire electrical discharge machining apparatus, which is presented as an electrical discharge machining apparatus according to the present invention, will be described in detail below with reference to the drawings. The present invention is not limited to the embodiments.

First Embodiment

Figure 1:
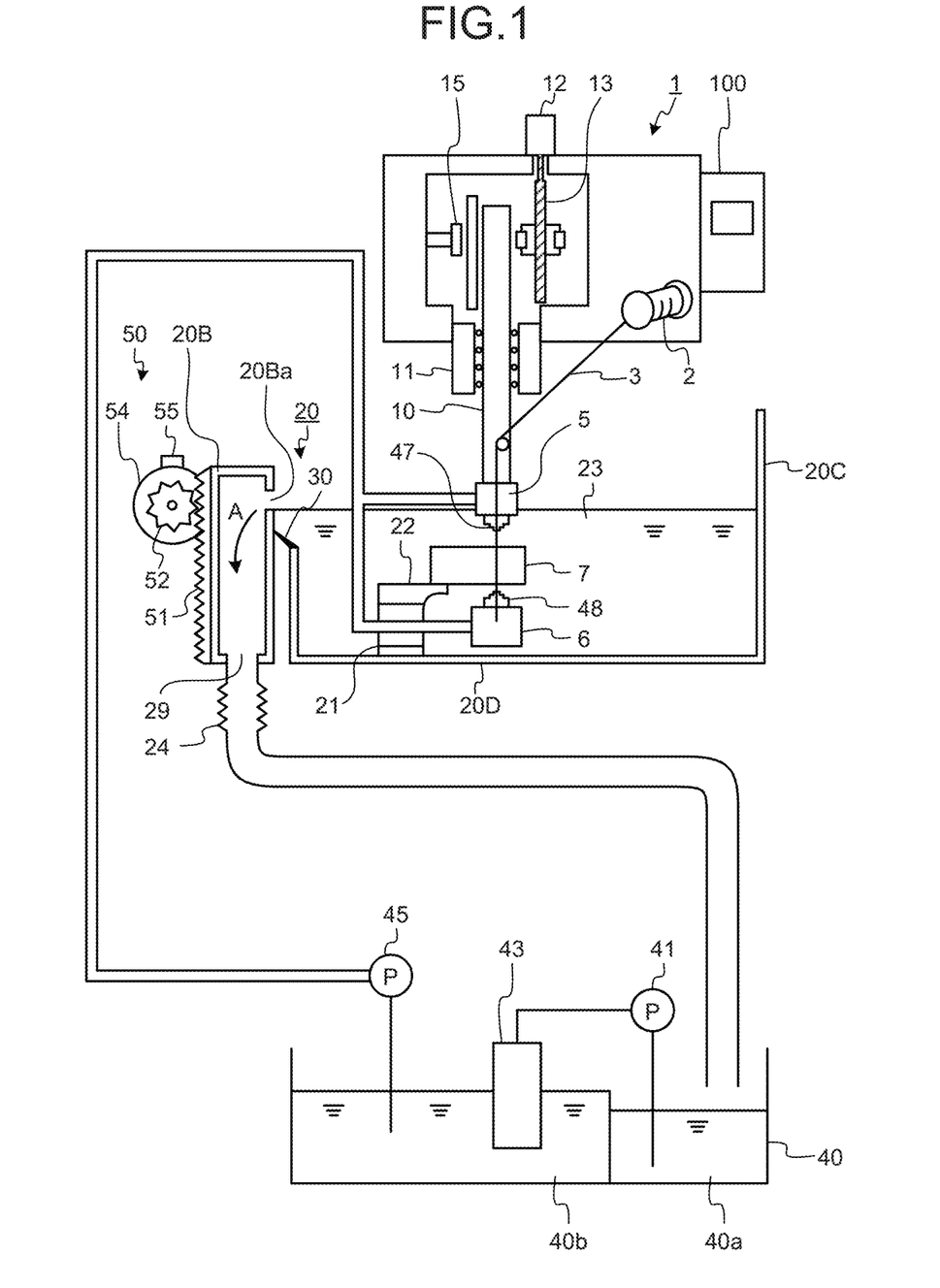
FIG. 1 is a longitudinal sectional view schematically illustrating an embodiment of a wire electrical discharge machining apparatus according to the present invention.
Figure 2:
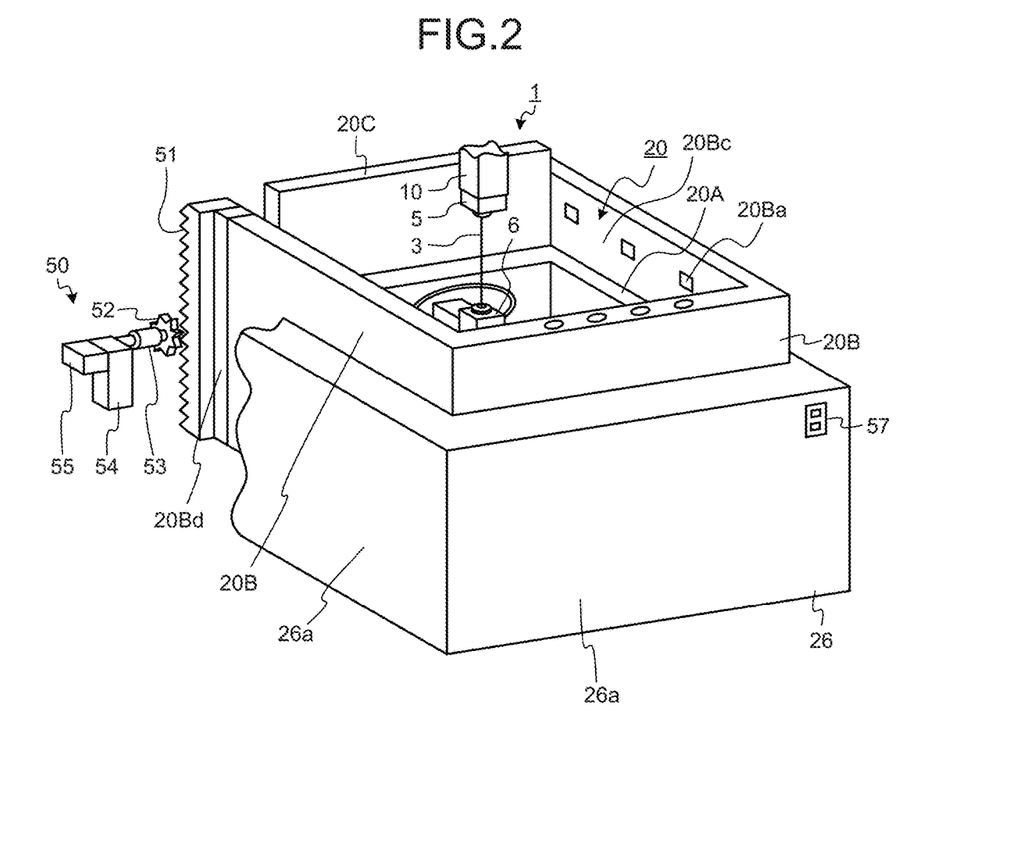
FIG. 2 is a perspective view schematically illustrating the shapes of a machining tank and an ascent/descent machining tank of the wire electrical discharge machining apparatus according to the embodiment.
Figure 3:
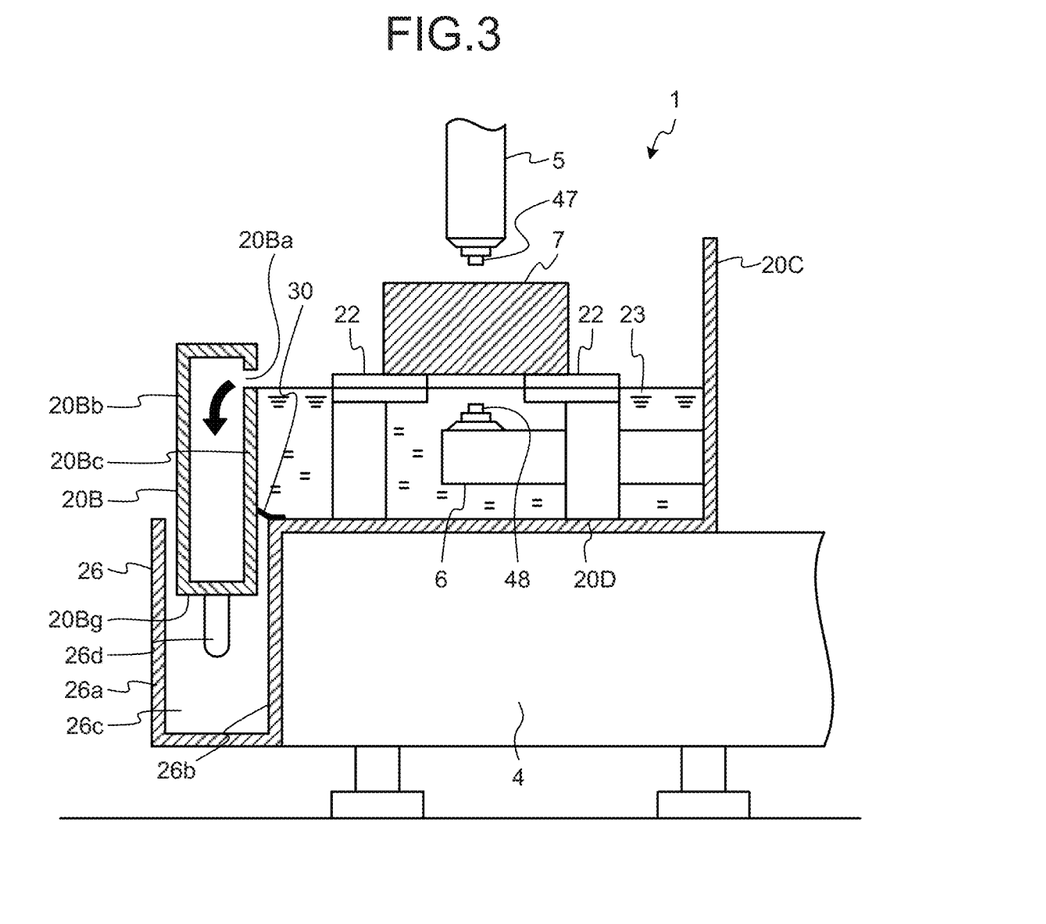
FIG. 3 is a longitudinal sectional view schematically illustrating the shapes of the machining tank, the ascent/descent machining tank, and a sub-tank of the wire electrical discharge machining apparatus according to the embodiment.

FIG. 1 is a longitudinal sectional view schematically illustrating an embodiment of a wire electrical discharge machining apparatus according to the present invention; FIG. 2 is a perspective view schematically illustrating the shapes of a machining tank and an ascent/descent machining tank of the wire electrical discharge machining apparatus according to the embodiment; FIG. 3 is a longitudinal sectional view schematically illustrating the shapes of the machining tank, the ascent/descent machining tank, and a sub-tank of the wire electrical discharge machining apparatus according to the embodiment. In FIG. 2, a workpiece, a surface plate, and a machining liquid are omitted. Additionally, a sub-tank 26, which wraps around the outer periphery of the wire electrical discharge machining apparatus, is partially cut away to clarify the arrangement of an ascent/descent device 50.

As illustrated in FIGS. 1 to 3, a wire electrical discharge machining apparatus 1 includes a wire supply bobbin 2 retained thereon. A wire electrode 3 is unwound from the wire supply bobbin 2. An upper wire guide 5 and a lower wire guide 6 each include a feeding unit and a wire guide unit internally and hold the wire electrode 3 above and below a workpiece 7. A Z-axis main spindle 10 has an extremity that the upper wire guide 5 is fixed to. A Z-axis guide 11 slidably supports, in an up-and-down direction, the main spindle 10 along the guide 11. A motor 12 is directly connected to a feed screw 13 having a nut that is coupled to the main spindle 10 such that the rotation of the motor 12 allows the nut to drive the main spindle 10 in the up-and-down direction.

A position detection unit 15 measures the Z-axis position of the main spindle 10 and controls the rotation of the motor 12. A machining tank 20 is placed on an undepicted XY cross table and includes a table 21 internally. The workpiece 7 is placed on a surface plate 22 provided on the table 21 and is immersed in a machining liquid 23.

The machining tank 20 includes: an immobile machining tank 20A, which is fixed to the top face of a bed 4 (see FIG. 3); an ascent/descent machining tank 20B, which is provided on the immobile machining tank 20A on the upper side in such a manner that the ascent/descent machining tank 20B is vertically movable; a rear-side tank wall 20C, which is attached to the immobile machining tank 20A and arranged on the rear side of the machining tank 20; and a bottom plate 20D. The ascent/descent machining tank 20B includes: an ascent/descent inner wall 20Bc; an ascent/descent outer wall 20Bb; and a bottom plate 20Bg. A seal 30 seals a gap between an inner wall 26b of the sub-tank 26 and the ascent/descent inner wall 20Bc of the ascent/descent machining tank 20B to prevent the machining liquid retained in the machining tank 20 from leaking out.

The ascent/descent machining tank 20B is made up of flattened hollow box-like members (each made up of the ascent/descent inner wall 20Bc, the ascent/descent outer wall 20Bb, and the bottom plate 20Bg). These hollow box-like members are connected such that they are in communication with each other and that they are formed into a substantially ⊃ shape as observed from above. The ascent/descent machining tank 20B has a channel formed inside, into which the machining liquid 23 is released. The ascent/descent machining tank 20B is arranged such that the ascent/descent machining tank 20B faces the rear-side tank wall 20C and is integrated into one piece with the rear-side tank wall 20C with appropriate sealing therebetween in a manner that allows the ascent/descent machining tank 20B to ascend and descend. The outside of the ascent/descent machining tank 20B is wrapped with an outer wall 26a of the sub-tank 26.

The ascent/descent machining tank 20B has a plurality of cutouts (e.g., drain ports, outlets) 20Ba in an upper portion of its inner face in such a manner that the cutouts 20Ba are disposed in the horizontal direction at predetermined intervals. The machining liquid 23 in the machining tank 20 is drained through the cutouts 20Ba (the arrow A in FIG. 1). Moving the ascent/descent machining tank 20B in its vertical direction (the Z axis direction) can adjust the level of a machining liquid to a given height and maintain it thereto and thus substantially performs liquid level control.

The reason that the plurality of cutouts 20Ba are provided in the upper portion of the ascent/descent inner wall 20Bc of the ascent/descent machining tank 20B is, as described above, to allow the machining tank 20 to be lowered sufficiently during tooling change without lowering the machining liquid to an extremely low level. Note that the drain ports for a machining liquid formed in the upper portion of the ascent/descent inner wall 20Bc of the ascent/descent machining tank 20B are not limited to the cutouts 20Ba and may be in any shape; for example, they may be slit-shaped holes extending in the horizontal direction.

The ascent/descent machining tank 20B, which is substantially ⊃ shaped as observed from above, has an end portion to which a connection member 20Bd is attached, and a rack 51 is provided on the connection member 20Bd in the vertical direction. A pinion 52 is arranged so as to mesh with the rack 51. The pinion 52 is coupled to a motor 54 via a shaft coupling 53. The rack 51, the pinion 52, the shaft coupling 53, and the motor 54 constitute the ascent/descent device 50, which raises and lowers the ascent/descent machining tank 20B.

A lower portion of the ascent/descent machining tank 20B is accommodated in the sub-tank 26, while the ascent/descent device 50 is disposed outside the sub-tank 26. The sub-tank 26 has an end wall 26c (see FIG. 3) at an end of the substantially ⊃ shape, as observed from above, of the sub-tank 26, and a slit 26d is provided in the end wall 26c. The connection member 20Bd, which connects the ascent/descent machining tank 20B and the ascent/descent device 50 placed outside the sub-tank 26, passes through the slit 26d.

The motor 54 is provided with an encoder 55, which detects the number of rotations. Signals of the encoder 55 are input to a control device 100 such that the control device 100 controls the ascent/descent device 50. Note that the ascent/descent device 50 is provided on each of the two ends of the substantially ⊃ shaped ascent/descent machining tank 20B, however only one of them is illustrated in FIG. 2.

The ascent/descent device 50 operates on the basis of drive signals from the control device 100. The sub-tank 26 has a front face on which an ascent/descent switch 57 is provided. By operating the ascent/descent switch 57, the ascent/descent machining tank 20B can be moved up and down.

A machining liquid supply device 40 is constituted by a polluted liquid tank 40a and a clean liquid tank 40b. A filter pump 41 is placed above the polluted liquid tank 40a and is connected to a filter 43. A supply pump 45 is placed above the clean liquid tank 40b and is coupled to upper and lower nozzles 47 and 48 to supply and eject the machining liquid to the wire electrode 3 and the workpiece 7. The machining liquid that has overflown into the ascent/descent machining tank 20B flows from a drain port 29 through an elastic communication member 24 to be drained into the machining liquid supply device 40.

When the machining liquid is supplied, the ascent/descent machining tank 20B controls the level of the machining liquid 23 with an overflow liquid level control method. Specifically, the ascent/descent machining tank 20B moves to an appropriate height for the machining liquid in which the workpiece 7 is to be immersed. Then, the supply pump 45 is operated to supply the machining liquid 23 to the machining tank 20. The machining tank 20 is filled with the machining liquid 23 and the machining liquid 23 starts overflowing at the height of the cutouts 20Ba. This maintains the liquid level at a constant height.

To machine the workpiece 7, the motor 12 is driven to move the upper nozzle 47, which is fixed to the extremity of the Z-axis main spindle 10, to a vicinity of the workpiece 7. After the machining tank 20 is filled with the machining liquid, the machining liquid is ejected from the upper and lower nozzles 47 and 48, and the wire electrode 3 is supplied by a wire moving unit. By allowing the workpiece 7 to achieve a given movement relative to the wire electrode 3 while electrical discharge power is supplied to the wire electrode 3 by a power supply, a desired shape is machined.

Figure 4:
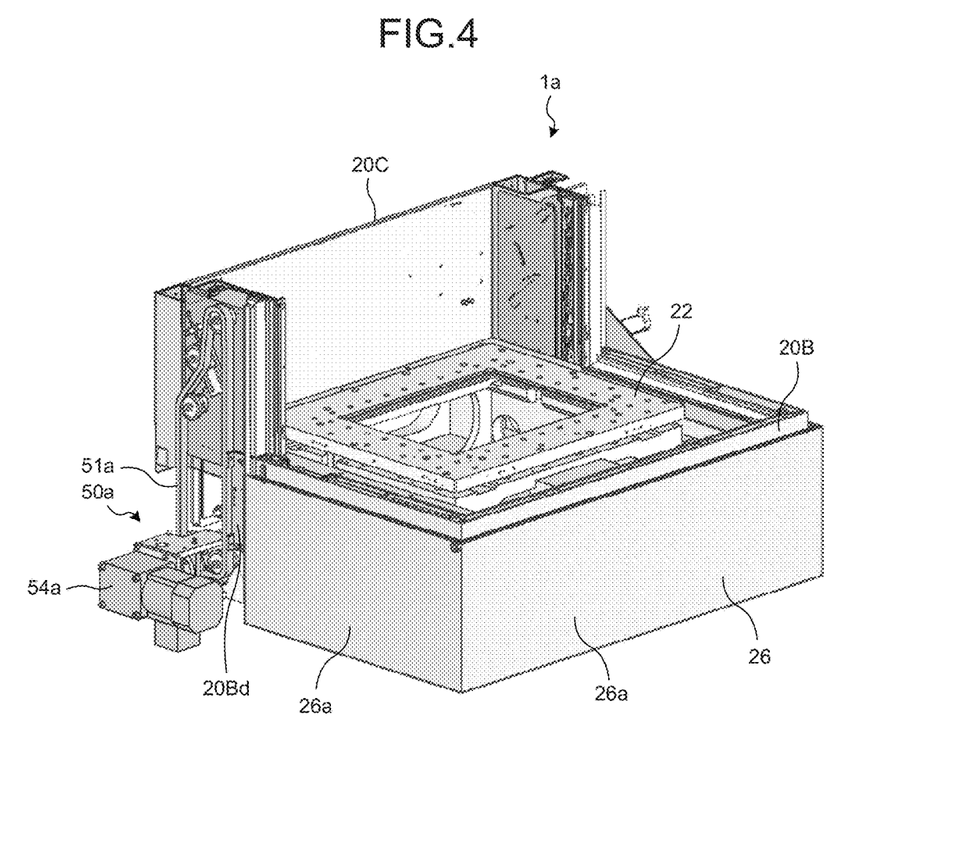
FIG. 4 is a perspective view illustrating the shapes of a machining tank, an ascent/descent machining tank, and a sub-tank of a wire electrical discharge machining apparatus that includes an ascent/descent device of a different form.
Figure 5:
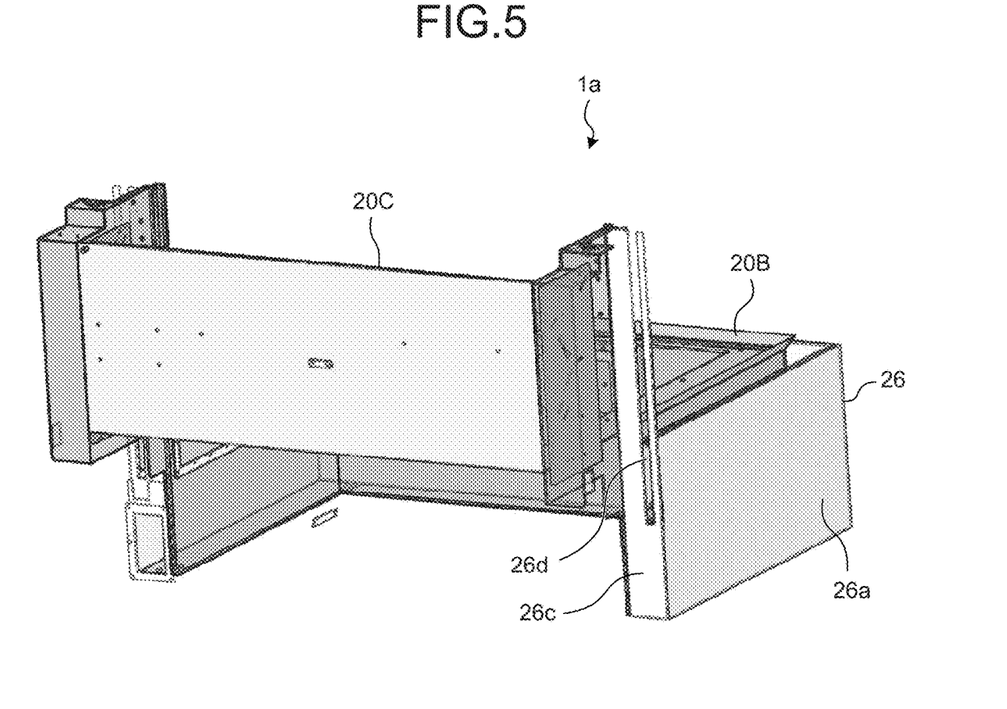
FIG. 5 is a rear perspective view of the wire electrical discharge machining apparatus illustrated in FIG. 4.

FIG. 4 is a perspective view illustrating the shapes of a machining tank, an ascent/descent machining tank, and a sub-tank of a wire electrical discharge machining apparatus that includes an ascent/descent device of a different form; FIG. 5 is a rear perspective view of the wire electrical discharge machining apparatus illustrated in FIG. 4. A wire electrical discharge machining apparatus 1a illustrated in FIGS. 4 and 5 includes an ascent/descent device 50a, which has a different form from the ascent/descent device 50 illustrated in FIGS. 1 and 2.

An ascent/descent machining tank 20B, which is substantially ⊃ shaped as observed from above, has an end portion to which a connection member 20Bd is attached. A belt (or a chain) 51a is placed over a pulley that is attached to an upper portion of a rear-side tank wall 20C and a pulley that is of a motor 54a and is attached to a lower portion of the rear-side tank wall 20C. The belt (or the chain) 51a is coupled to the connection member 20Bd. The rotation of the motor 54a enables the belt 51a to run up and down and thereby raise and lower the ascent/descent machining tank 20B. The belt (or the chain) 51a, the pulleys, and the motor 54a constitute the ascent/descent device 50a. Except for the ascent/descent device 50a, the wire electrical discharge machining apparatus 1a is similar to the wire electrical discharge machining apparatus 1 illustrated in FIGS. 1 to 3 and thus is designated with identical symbols, and the description is omitted.

The wire electrical discharge machining apparatus according to the present embodiment may be applied to the wire electrical discharge machining apparatus 1, which includes the pinion & rack type ascent/descent device 50, and to the wire electrical discharge machining apparatus 1a, which includes the belt (or chain) type ascent/descent device 50a.

Figure 6:
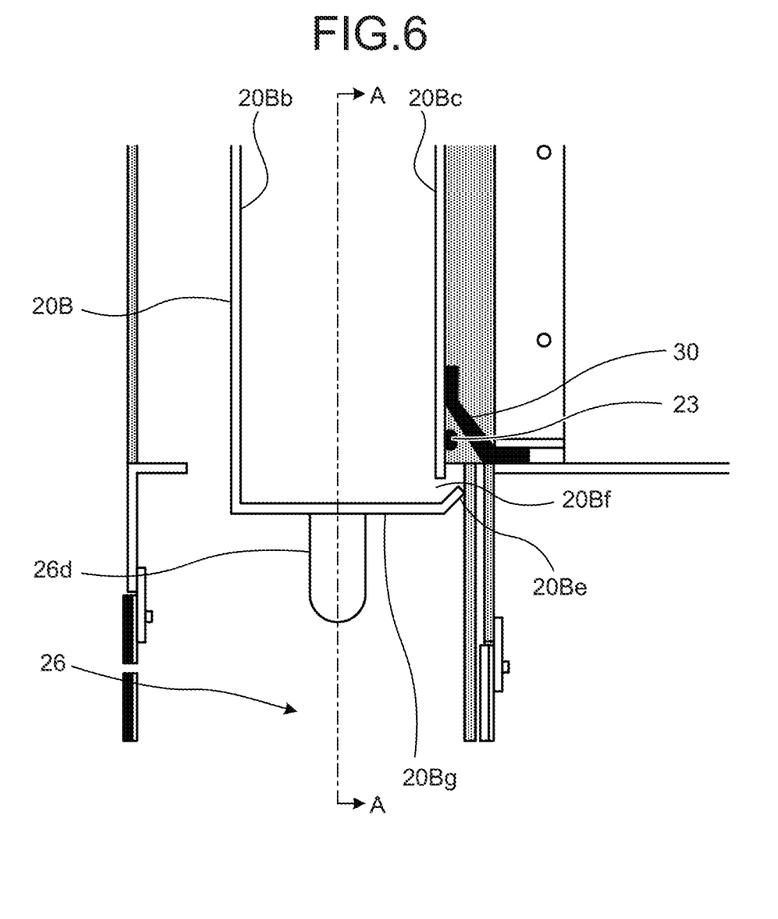
FIG. 6 is a longitudinal sectional view illustrating the ascent/descent machining tank and the sub-tank according to a first embodiment.
Figure 7:
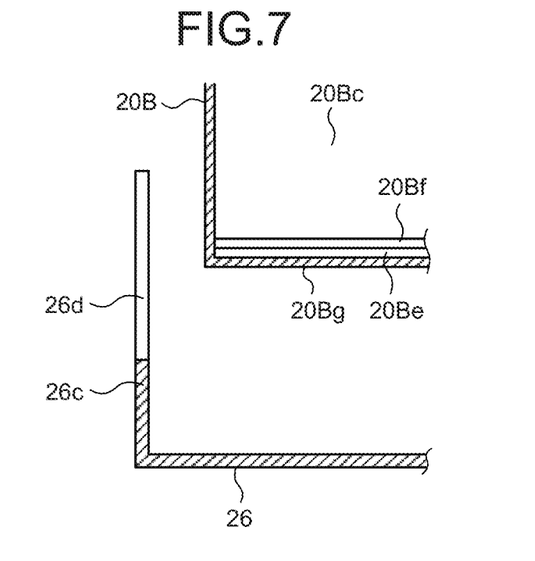
FIG. 7 is a longitudinal sectional view along the line A-A in FIG. 6.

With reference to FIGS. 6 and 7, the characteristic configuration of the wire electrical discharge machining apparatuses 1 and 1a according to the first embodiment will now be described. FIG. 6 is a longitudinal sectional view illustrating the ascent/descent machining tank and the sub-tank according to the first embodiment; FIG. 7 is a longitudinal sectional view along the line A-A in FIG. 6.

As illustrated in FIGS. 6 and 7, a slit-like receiving opening 20Bf is provided at the bottom of one of the ends of the ascent/descent machining tank 20B on the ascent/descent inner wall 20Bc side for receiving the machining liquid 23 that leaks through the seal 30 and drips along the ascent/descent inner wall 20Bc and for recovering the machining liquid 23 in the ascent/descent machining tank 20B. The receiving opening 20Bf can be formed by cutting open a lower portion 20Be of the ascent/descent inner wall 20Bc. Providing the receiving opening 20Bf only at each of the ends of the ascent/descent machining tank 20B is sufficient.

The slit-like receiving opening 20Bf is provided to receive the machining liquid 23 that leaks through the seal 30 and drips along the ascent/descent inner wall 20Bc and to collect the machining liquid 23 in the ascent/descent machining tank 20B. Thus, there is no risk of the dripped machining liquid 23 flowing on the underside of the bottom plate 20Bg of the ascent/descent machining tank 20B and scattering toward the slit 26d to splash through the slit 26d and onto the floor surface outside the sub-tank 26 where the electrical discharge machining apparatus 1 or 1a is installed.

Second Embodiment

Figure 8:
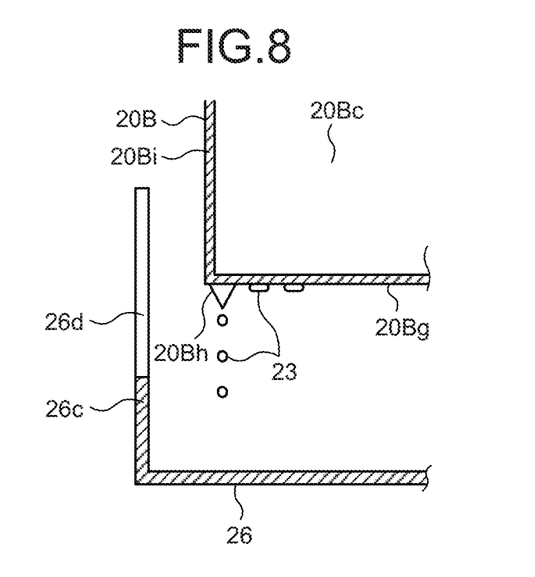
FIG. 8 is a longitudinal sectional view, like FIG. 7, illustrating an ascent/descent machining tank and a sub-tank according to a second embodiment.

FIG. 8 is a longitudinal sectional view, like FIG. 7, illustrating an ascent/descent machining tank and a sub-tank according to a second embodiment. As illustrated in FIG. 8, a ridge 20Bh pointed downward is attached to the bottom of an ascent/descent machining tank 20B on the slit 26d side in such a manner that the ridge 20Bh is parallel with an end wall 20Bi of the ascent/descent machining tank 20B.

By attaching the downward-pointed ridge 20Bh to the bottom of the ascent/descent machining tank 20B on the slit 26d side in such a manner that the ridge 20Bh is parallel with the end wall 20Bi of the ascent/descent machining tank 20B, a machining liquid 23 that leaks through a seal 30 and drips along an ascent/descent inner wall 20Bc to flow on the underside of a bottom plate 20Bg and approach the slit 26d drips from the pointed edge of the ridge 20Bh into a sub-tank 26. Thus, there is no risk of the machining liquid 23 scattering toward the slit 26d and splashing through the slit 26d and onto the floor surface outside the sub-tank 26 where an electrical discharge machining apparatus 1 or 1a is installed.

Third Embodiment

Figure 9:
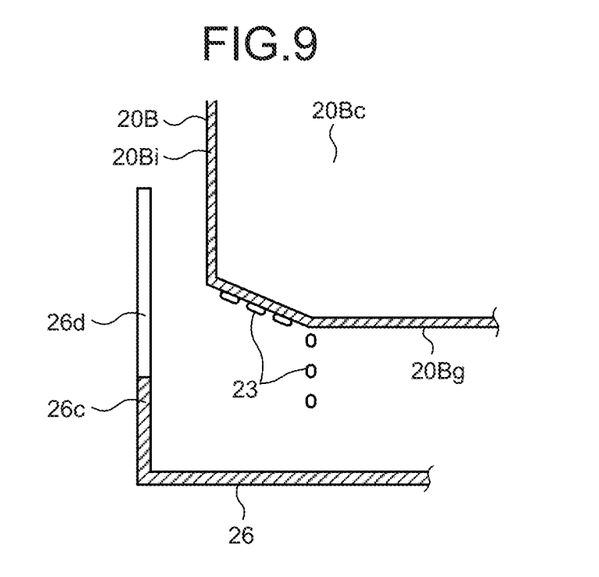
FIG. 9 is a longitudinal sectional view, like FIG. 7, illustrating an ascent/descent machining tank and a sub-tank according to a third embodiment.

FIG. 9 is a longitudinal sectional view, like FIG. 7, illustrating an ascent/descent machining tank and a sub-tank according to a third embodiment. As illustrated in FIG. 9, the bottom of an ascent/descent machining tank 20B on the slit 26d side has an upgrade toward the slit 26d (that is a downgrade toward the side opposite from the slit 26d).

By providing the upgrade toward the slit 26d at the bottom of the ascent/descent machining tank 20B on the slit 26d side (that is the downgrade toward the side opposite from the slit 26d), a machining liquid 23 that leaks through a seal 30 and drips along an ascent/descent inner wall 20Bc to flow on the underside of a bottom plate 20Bg flows toward the side opposite from the slit 26d and drips at the end of the down grade into a sub-tank 26. Thus, there is no risk of the machining liquid 23 scattering toward the slit 26d and splashing through the slit 26d and onto the floor surface outside the sub-tank 26 where an electrical discharge machining apparatus 1 or 1a is installed.

Fourth Embodiment

Figure 10:
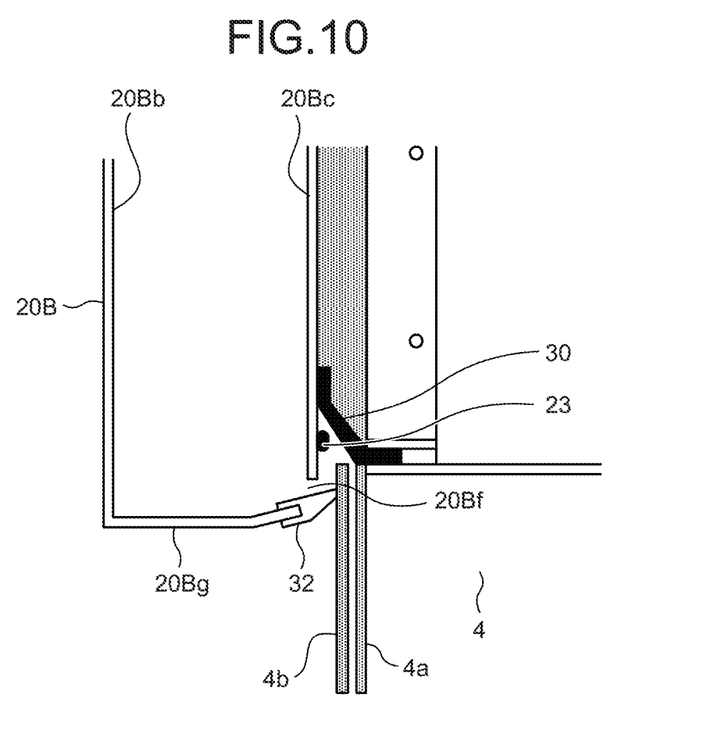
FIG. 10 is a longitudinal sectional view, like FIG. 6, illustrating an ascent/descent machining tank according to a fourth embodiment.

FIG. 10 is a longitudinal sectional view, like FIG. 6, illustrating an ascent/descent machining tank according to a fourth embodiment. As illustrated in FIG. 10, a slit-like receiving opening 20Bf is provided at the bottom of an ascent/descent machining tank 20B on the ascent/descent inner wall 20Bc side for receiving a machining liquid 23 that leaks through a seal 30 and drips along the ascent/descent inner wall 20Bc and for recovering the machining liquid 23 in an ascent/descent machining tank 20. Additionally, a seal member 32 is attached to the edge of a bottom plate 20Bg of the ascent/descent machining tank 20B at which the ascent/descent machining tank 20B is cut open to form the receiving opening 20Bf. The seal member 32 is attached in such a manner that its edge is in contact with a plate member 4b arranged along a side face 4a of a bed 4 that supports a machining tank 20. The receiving opening 20Bf and the seal member 32 are provided along the entire length of the ascent/descent inner wall 20Bc side of the ascent/descent machining tank 20B.

The slit-like receiving opening 20Bf is provided to receive the machining liquid 23 that leaks through the seal 30 and drips along the ascent/descent inner wall 20Bc and to recover the machining liquid 23 in the ascent/descent machining tank 20B. Thus, there is no risk of the dripped machining liquid 23 flowing on the underside of the bottom plate 20Bg of the ascent/descent machining tank 20B and scattering toward the slit 26d to splash through the slit 26d and onto the floor surface outside a sub-tank 26 where an electrical discharge machining apparatus 1 or 1a is installed. Additionally, because of the seal member 32 attached to the edge of the bottom plate 20Bg of the ascent/descent machining tank 20B at which the ascent/descent machining tank 20B is cut open to form the receiving opening 20Bf, in such a manner that the edge of the seal member 32 is in contact with the plate member 4b arranged along the side face 4a of the bed 4 that supports the machining tank 20, the ascent/descent machining tank 20B according to the fourth embodiment is capable of recovering all the machining liquid 23 that has leaked from the seal 30 and thereby eliminates the need to provide the sub-tank 26.

While the ascent/descent machining tank 20B according to the fourth embodiment is substantially ⊐ shaped such that the ascent/descent machining tank 20B constitutes three faces of the machining tank 20, the ascent/descent machining tank 20B may be an ascent/descent machining tank that constitutes only one face of the machining tank 20. Furthermore, while the machining tank 20 according to the fourth embodiment is fixed to the bed 4 and the main spindle moves along the X and Y axes, the fourth embodiment may be applied to a type of wire electrical discharge machining apparatus in which the machining tank 20 is provided on an XY cross table. The fourth embodiment may also be applied to a type of wire electrical discharge machining apparatus in which the main spindle travels along one of the X and Y axes and the machining tank 20 travels along the other of the X and Y axes. Furthermore, the ascent/descent machining tank 20B according to the fourth embodiment may be applied to a die sinking electrical discharge machining apparatus.

REFERENCE SIGNS LIST 1 and 1a wire electrical discharge machining apparatus, 2 wire supply bobbin, 3 wire electrode, 4 bed, 4a side face, 4b plate member, 5 upper wire guide, 6 lower wire guide, 7 workpiece, 10 main spindle, 11 guide, 12 motor, 13 feed screw, 15 position detection unit, 20 machining tank, 20A immobile machining tank, 20B ascent/descent machining tank, 20Ba cutout (drain port), 20Bb ascent/descent outer wall, 20Bc ascent/descent inner wall, 20Bd connection member, 20Be lower portion, 20Bf receiving opening, 20Bg bottom plate, 20Bh ridge, 20Bi end wall, 20C rear-side tank wall, 20D bottom plate, 21 table, 22 surface plate, 23 machining liquid, 24 communication member, 26 sub-tank, 26a outer wall, 26b inner wall, 26c end wall, 26d slit, 29 drain port, 30 seal, 32 seal member, 40 machining liquid supply device, 40a polluted liquid tank, 40b clean liquid tank, 41 filter pump, 43 filter, 45 supply pump, 47 upper nozzle, 48 lower nozzle, 50 and 50a ascent/descent device, 51 rack, 51a belt (chain), 52 pinion, 53 shaft coupling, 54 and 54a motor, 55 encoder, 57 ascent/descent switch, 100 control device.

The invention claimed is:

1. An electrical discharge machining apparatus, comprising:
   a surface plate that a workpiece is placed on;
   a machining tank that surrounds the surface plate, retains a machining liquid, and has at least a part that serves as a box-shaped vertically moveable ascent/descent machining tank, the ascent/descent machining tank having an outlet in an ascent/descent inner wall of the ascent/descent machining tank, the outlet allowing the machining liquid to overflow to the ascent/descent machining tank;
   an ascent/descent device that raises and lowers the ascent/descent machining tank;
   a sub-tank that receives the machining liquid that leaks out from the machining tank;
   a slit that is provided in an end wall of the sub-tank for allowing a connection member to pass through, the connection member connecting the ascent/descent machining tank and the ascent/descent device; and
   a seal that is arranged in a gap between the ascent/descent machining tank and an inner wall of the sub-tank and prevents the machining liquid in the machining tank from leaking out into the sub-tank,
   the electrical discharge machining apparatus creating an electrical discharge in a small gap between the workpiece and an electrode to machine the workpiece, the workpiece being immersed in the machining liquid retained in the machining tank, wherein a slit-like receiving opening is provided at a bottom of the ascent/descent machining tank on the ascent/descent inner wall side, the slit-like receiving opening receiving the machining liquid that leaks through the seal and drips along the ascent/descent inner wall and recovering the machining liquid in the ascent/descent machining tank.

2. An electrical discharge machining apparatus, comprising:

a surface plate that a workpiece is placed on;

a machining tank that surrounds the surface plate, retains a machining liquid, and has at least a part that serves as a substantially box-shaped vertically moveable ascent/descent machining tank, the ascent/descent machining tank having an outlet in an ascent/descent inner wall of the ascent/descent machining tank, the outlet allowing the machining liquid to overflow to the ascent/descent machining tank;

an ascent/descent device that raises and lowers the ascent/descent machining tank; and a seal that is arranged in a gap between the ascent/descent machining tank and a plate member arranged along a side face of a bed that supports the machining tank, the seal preventing the machining liquid in the machining tank from leaking downward, the electrical discharge machining apparatus creating an electrical discharge in a small gap between the workpiece and an electrode to machine the workpiece, the workpiece being immersed in the machining liquid retained in the machining tank, wherein a slit-like receiving opening is provided at a bottom of the ascent/descent machining tank on the ascent/descent inner wall side, the slit-like receiving opening receiving the machining liquid that leaks through the seal and drips along the ascent/descent inner wall and recovering the machining liquid in the ascent/descent machining tank, and a seal member is attached to an edge of a bottom plate of the ascent/descent machining tank at which the ascent/descent machining tank is cut open to form the receiving opening, the seal member being attached in such a manner that an edge of the seal member is in contact with the plate member arranged along the side face of the bed that supports the machining tank.

\* \* \* \* \*